(12) United States Patent
McMahon

(10) Patent No.: US 9,776,813 B2
(45) Date of Patent: Oct. 3, 2017

(54) MOBILE DRY MATERIAL STORAGE

(71) Applicant: SOURCE LOGISTICS LTD., Calgary (CA)

(72) Inventor: Jim McMahon, Calgary (CA)

(73) Assignee: SOURCE ENERGY SERVICES CANADIAN LOGISTICS LP, Alberta (CA)

(*) Notice: Subject to any disclaimer, the term of this patent is extended or adjusted under 35 U.S.C. 154(b) by 746 days.

(21) Appl. No.: 13/923,516

(22) Filed: Jun. 21, 2013

(65) Prior Publication Data

US 2014/0377042 A1 Dec. 25, 2014

(51) Int. Cl.
*B65G 63/00* (2006.01)

(52) U.S. Cl.
CPC ....... *B65G 63/008* (2013.01); *Y10T 29/49826* (2015.01)

(58) Field of Classification Search
CPC .................................................. B65G 63/008
USPC ....................................... 414/332; 198/370.1
See application file for complete search history.

(56) References Cited

U.S. PATENT DOCUMENTS

| | | | | |
|---|---|---|---|---|
| 2,856,083 A | * | 10/1958 | Corrigan .............. | B65G 63/008 198/570 |
| 3,314,557 A | * | 4/1967 | Sackett, Sr. ................ | B28C 9/00 366/18 |
| 4,552,726 A | * | 11/1985 | Grappelli ............ | C05F 17/0009 198/569 |
| 5,871,324 A | * | 2/1999 | Horak .................. | B65G 63/008 198/594 |
| 6,609,543 B2 | * | 8/2003 | Sridhar ................... | B63B 35/44 141/104 |
| 7,252,309 B2 | * | 8/2007 | Eng Soon ............... | B01F 5/241 105/250 |
| 2005/0260062 A1 | * | 11/2005 | Boasso ................. | B28C 7/0084 414/332 |
| 2012/0099954 A1 | * | 4/2012 | Teichrob ............. | B65G 63/008 414/332 |

* cited by examiner

*Primary Examiner* — Jonathan Snelting
(74) *Attorney, Agent, or Firm* — Brent P. Johnson; Berg Hill Greenleaf Ruscitti, LLP

(57) ABSTRACT

A system that can be assembled at a well drilling or other site for storing bulk material such as sand includes a plurality of storage bins configured as trailers, a skid that includes a lower conveyor, a bucket elevator and a top conveyor system. At the site, the bins and the elevator are vertically oriented and stood on the skid, resulting in discharge outlets on the bins becoming positioned over the lower conveyor. The top conveyor is installed on top of the bins. In operation, the elevator lifts the material and discharges it onto the top conveyor system. The top conveyor system discharges the material into the bins for storage. The stored material is controllably discharged from the discharge outlets of the bins onto the lower conveyor from which the material is conveyed to one end of the skid for transport to a new location or directly into a blender.

12 Claims, 9 Drawing Sheets

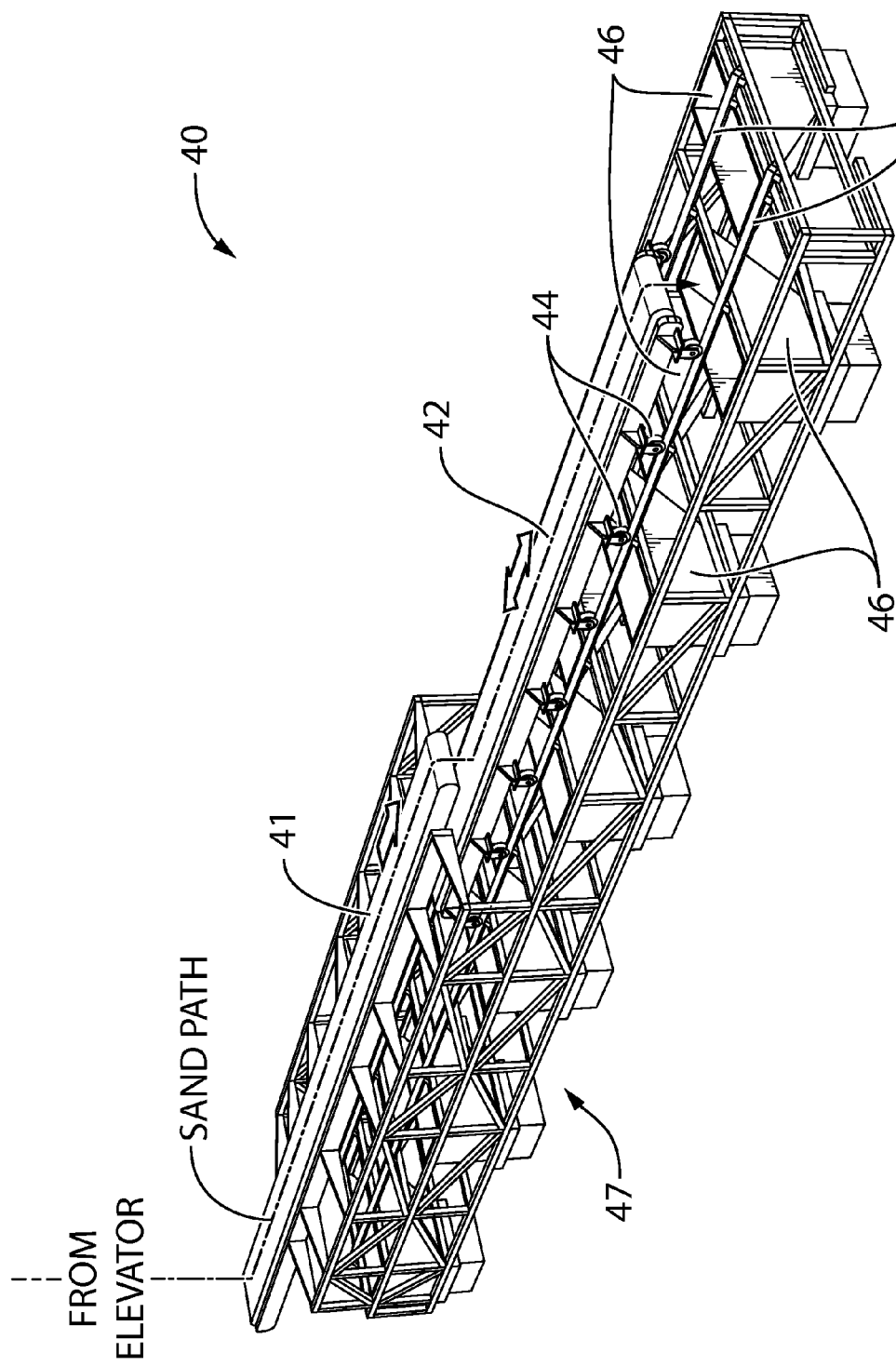

MOBILE DRY MATERIAL STORAGE

BACKGROUND

The present invention relates to the handling, storing, and distribution of bulk dry materials, such as sand.

There are many applications in which it is necessary to store large amounts of bulk dry material at a site. The following description gives the background of the invention in the context of one such application—the handling, storage and distribution of silica sand used as a proppant at a gas or oil well site in carrying out the process known as hydraulic fracturing, or "fracking." It should be understood, however, that the invention is not so limited.

The conventional prior art approach to storing sand at a well site is to place storage trailers horizontally on the ground and load and unload the sand using pneumatics. Disadvantageously, this requires a large footprint on the site, which has an impact on site lease costs and has environmental impacts as well. Other problems with this approach include inefficient use of trucking equipment, increased complexity of operations at the well site and, ultimately, lower downhole production due to proppant damage.

If, in order to ameliorate these problems, only a few storage trailers are used on site, then other issues arise. For example, having low sand capacity at the well site causes logistical problems and increases incremental costs associated with truck and rail demurrage. The loading and unloading of the sand is inefficient. And pneumatic filling changes the particles of silica sand from their generally spherical shape to irregular/broken shapes. This results in less negative space, i.e., less space between the sand particles, which leads to lower well conductivity, i.e. lower rates of extraction of the oil or other material being drilled for. Pneumatic pumping also creates an unhealthy dust.

A known alternative to the horizontal storage approach, which addresses at least some of the above problems—such as site footprint—is to store the sand vertically in free-standing silo units that can be trucked to the well site and then stood on end. The silo units are filled with sand from the top and the sand can then be gravity-drained or discharged from each silo unit through a chute extending from the side of the silo unit. Use of such free-standing silo units ameliorates some of the problems associated with the use of horizontal storage trailers.

SUMMARY OF THE INVENTION

We have recognized, however, that further improvements are desirable and, indeed, possible. In particular, we have come to recognize that a particularly disadvantageous aspect of the prior art silo units arises from the fact that each unit brought to the site is a discrete system. This means that the silo units must be individually filled pneumatically, giving rise to the above-noted problems inherent in that approach. Another problem is that it can take quite a lot of time—anywhere from 35 minutes to 60 minutes or longer—to fill the silo units. Having to transfer filling and unloading equipment from one silo unit to another is itself time-consuming. Moreover, the free-standing nature of the silo units requires that there be enough space between the units to allow for trucks and other equipment to load and unload the sand, which wastes space at the site.

A system embodying the principles of the invention improves over the prior art in a number of aspects. The system includes a plurality of elongate storage bins—illustratively having a generally rectangular cross-section—that can be trucked to a site horizontally and then lifted and positioned vertically onto a base structure, or "skid," that holds the bins upright in at least one line—illustratively touching, or at least very close to, one another. A downward-facing end of each bin has a discharge outlet that can be controllably opened and closed to allow sand or other product in the bins to be discharged downwards due to gravity onto a conveyor.

Particular embodiments of the bins include legs or other bin-support structure surrounding the discharge outlet. The bins are supported on the legs or other bin-support structure when positioned on the skid. Since the legs and, illustratively, reinforcing cross members surround the discharge outlet, the discharge outlet is protected from accidental damage when a bin is being raised or lowered or otherwise moved about when the system is being assembled or disassembled In preferred embodiments, a bottom conveyor is disposed within the skid in such a way that the dispensed material falls from the bins onto the bottom conveyor. The bottom conveyor is arranged to convey the material thus dispensed to one end of the skid from which the conveyed material can be, for example, loaded onto a blender, transfer belt or truck via a stinger. In particular embodiments, the bottom conveyor runs down the center of the skid and the bins are supported in two lines with their discharge outlets positioned over the bottom conveyor.

Also in preferred embodiments, the system further includes a vertical elevator, such as a high-capacity bucket elevator, installable on an end portion of the skid. The elevator lifts material to be stored to the level above the top of the positioned bins. Such embodiments illustratively further include a top conveyor system positionable on the bins and arranged to receive material discharged at the top of the elevator and to distribute the material into each bin via a filling inlet in the upper end of each bin.

The invention provides many benefits over the prior art. Vertical, instead of horizontal, placement on the site gives rise to a much smaller footprint. This reduces site congestion and increases the volume of material that can be stored within a given site area. The reduced footprint saves time and money on site preparation and reclamation. Since in preferred embodiments the material is transported on conveyor belts at every point in the delivery/storage/dispensing process, there is virtually no damage to sand grains or other material that might otherwise be damaged during handling, as is the case for pneumatic handling. The fact that a greater amount of material can be stored on site within a given footprint as compared to prior art approaches reduces standby time as one waits for trucks to arrive to deliver material or to haul it away. The fact that the bins are fillable using a vertical conveying mechanism such as a bucket elevator means that belly dump trailers can be used to disperse their product onto a drive-over conveyor system at ground level that feeds the material into the elevator, allowing for very efficient loading of the material into the bins and, in particular, allows for the drive-over conveyor system and the bins to be filled simultaneously. Indeed, we have observed at least a three-fold reduction in the time required to unload and store material brought to the site. Unlike the prior art use of individual horizontal or vertical bins, the present system allows delivering trucks to disperse the material at a single point of discharge, rather than having to back up to the individual units, which reduces site congestion, speeds delivery and storage of the delivered material, and enhances site safety. Less manpower than prior art approaches is required to receive, store and dispense the material. Indeed, the system can be readily operated by two workers. And we have observed that something like 30% fewer trucks may be required to move a given amount of material within a given amount of time as compared to the horizontal storage approach—the percentage depending on the particular maximum allowable vehicle weight limits imposed by various jurisdictions.

DRAWINGS

FIG. 9 is a perspective view of an illustrative top conveyor system that can be used to distribute and dispense the material to be stored into the bins.

DETAILED DESCRIPTION OF AN ILLUSTRATIVE EMBODIMENT

Figure 1:
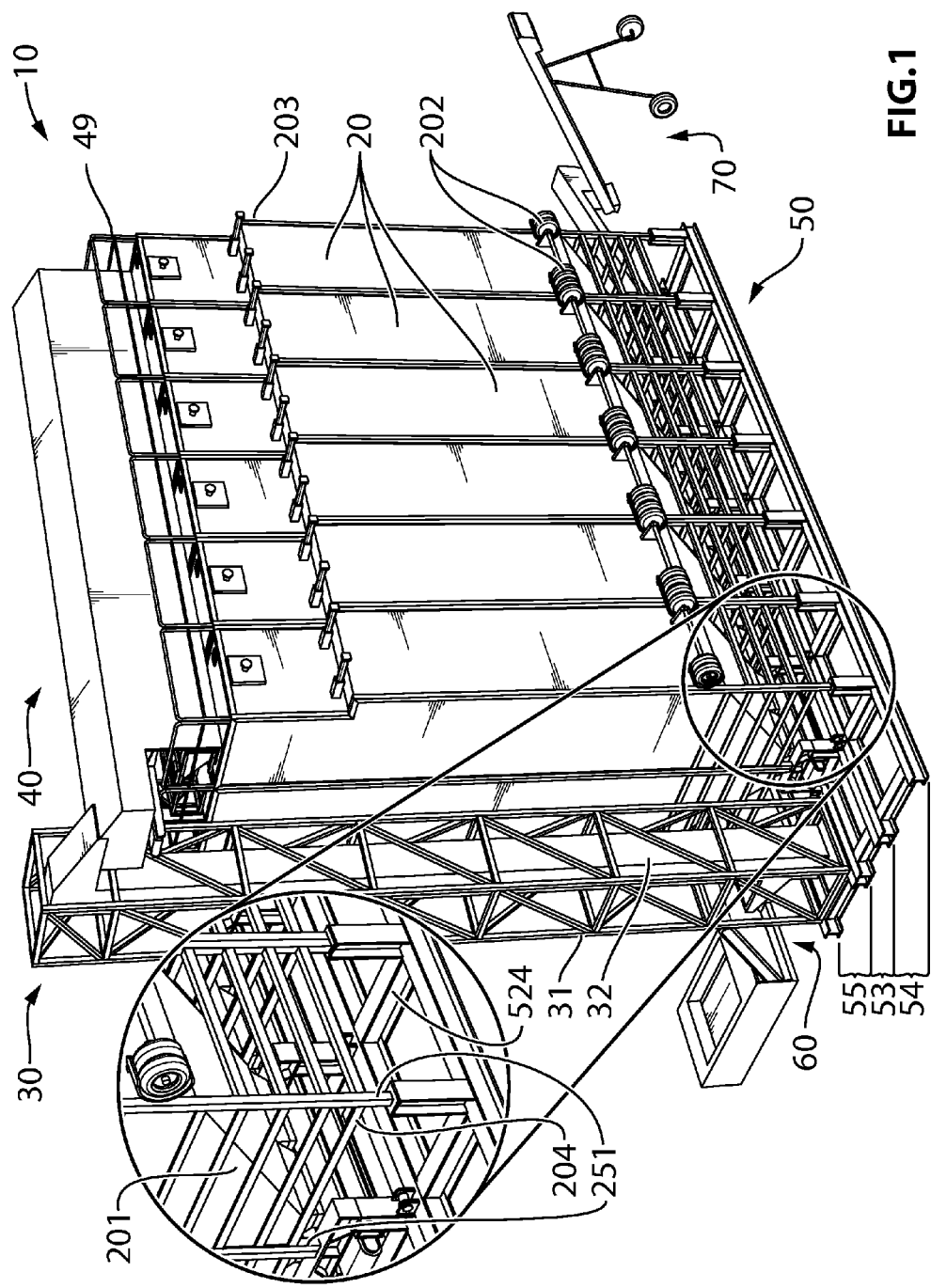
FIG. 1 is a perspective view of an illustrative system ("the system") embodying the principles of the present invention, the system as shown having been assembled and ready to receive and store sand or other material and to thereafter discharge same.
Figure 2:
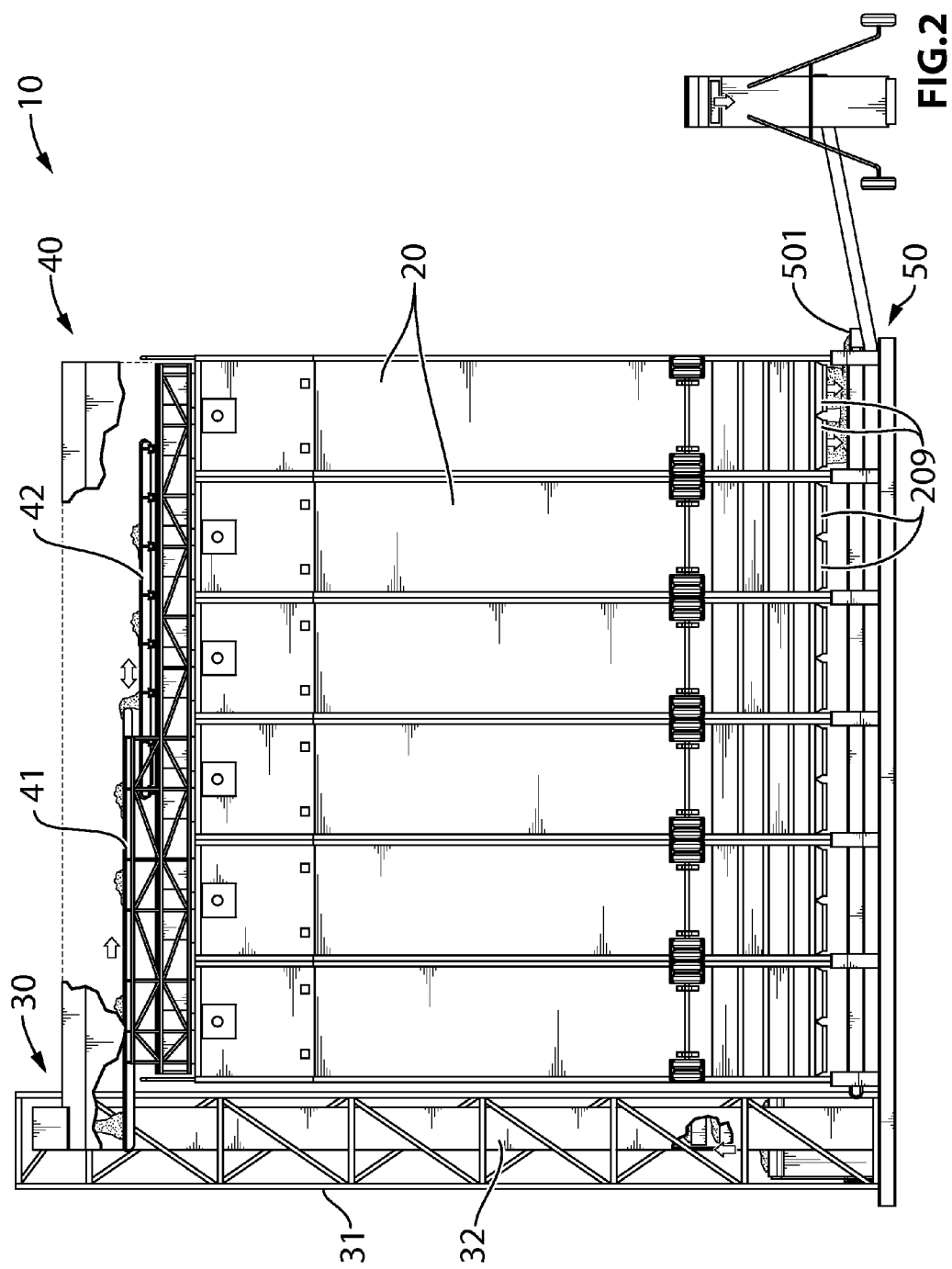
FIG. 2 is a side view of the system.

Reference is first made to FIGS. 1-5 depicting various views of an illustrative system 10 embodying the principles of the present invention, the system having been assembled and ready to receive and store sand or other material and to thereafter discharge same.

System 10 includes a plurality of elongate storage bins 20 which are substantially rectangular in cross-section over the majority of their length so as to comprise an elongate box in which sand or other material can be stored. Bins 20 are positioned vertically upright on a base structure, or "skid," 50 in at least one line—illustratively touching, or at least very close to, one another. In this embodiment, there are 12 bins arranged in two lines of 6 bins each. Each bin 20 has a discharge end 201 through which product in the bins can be discharged downwardly via gravity feed. Discharge end 201 includes a discharge outlet 209 that can be closed and opened (via a mechanism not shown) to controllably dispense sand or other material stored in the bin as desired.

Each of bins 20 includes legs 251 or other bin-support structure surrounding the discharge end 201. Legs 251 are interconnected by cross-members 204. The bins are supported on the legs put into position on skid 50, as described in further detail hereinbelow. Legs 251 extend from the storage portion further than discharge outlet 209 extends therefrom, so that the legs protect the discharge outlet from damage during movement of the storage bin—particularly when it is being moved between horizontal and vertical orientations.

Each of bins 20 is configured as a trailer brought to the site by a tractor 210 in a tractor-trailer configuration. The trailer is illustratively a single-axle trailer but could be, for example, a double-axle trailer in other embodiments. Each bin has a wheel-and-axle assembly 202 supporting the bin at one end and a stand 203 that is lowered to support the bin upon its being disconnected from tractor 210. Each bin has a conventional coupling device that allows it to be coupled to tractor 210 when being hauled A variable-speed bottom conveyor 501 is disposed within the skid in such a way that when one or more of the bin discharge outlets 209 are opened and material in the bins is allowed to flow downward out of the bins via gravity feed, the dispensed material falls onto that conveyor. Conveyor 501 illustratively runs down the center of the skid, parallel to the lines of bins. The material thus dispensed from the bins is conveyed by conveyor 501 to one end of the skid from which the conveyed material can be loaded onto trucks via a truck-loading stinger system 70, which illustratively comprises conveyor 71 and stinger 72 disposed at approximately right angles to one another. The outline of the truck into which the material is thus loaded is shown in dashed outline FIG. 3 and designated at 231.

Figure 3:
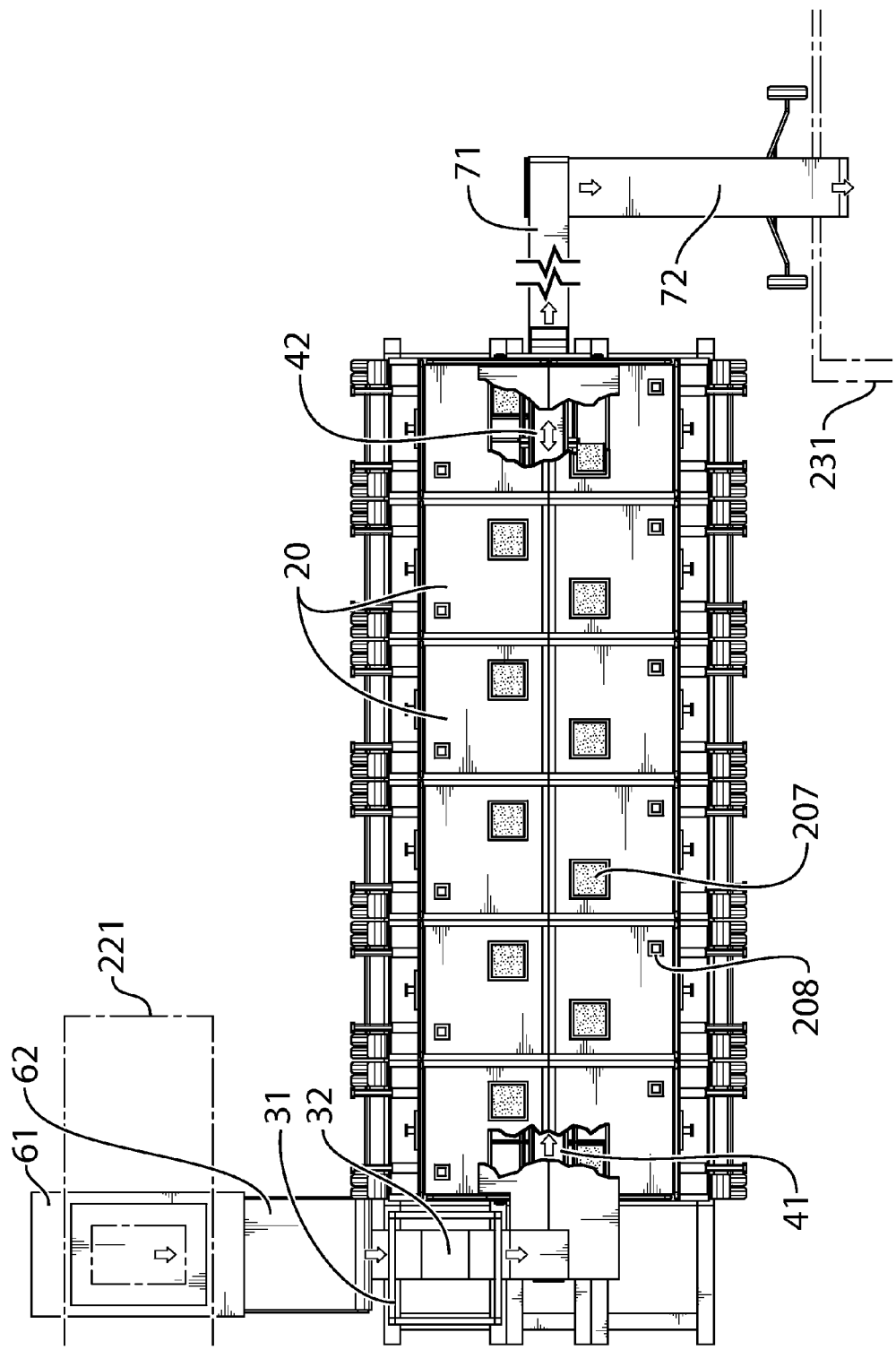
FIG. 3 is a top view of the system.
Figure 4:
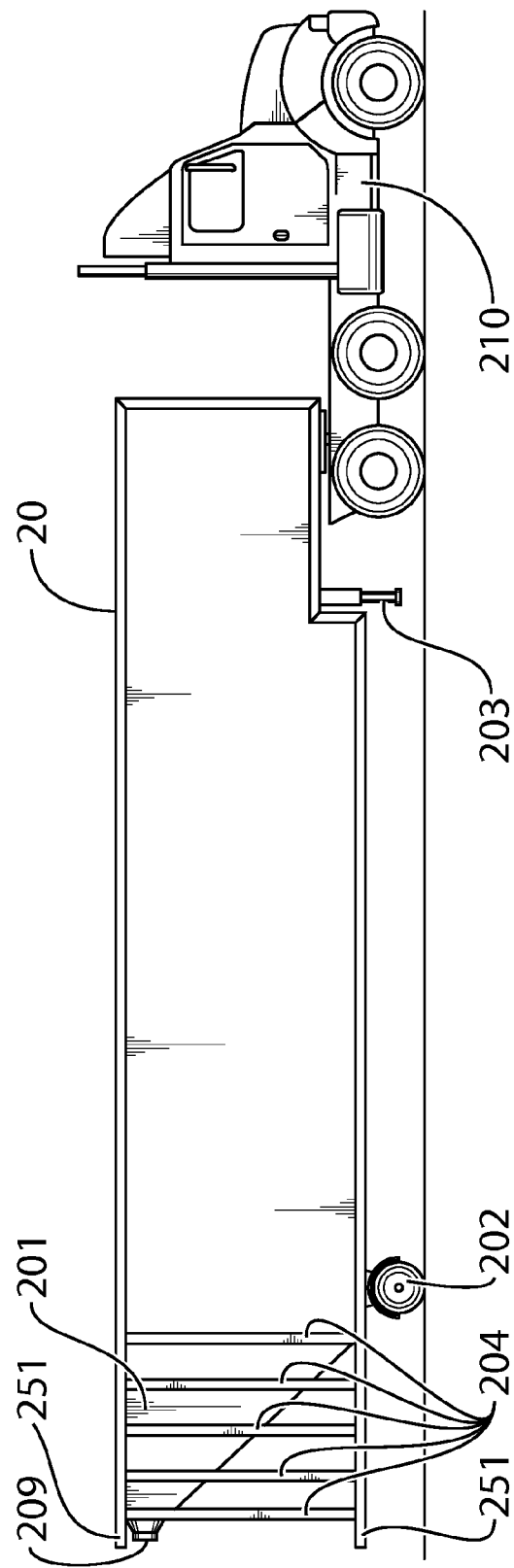
FIG. 4 is a side view of an illustrative embodiment of one of the bins of the system.

An elevator system 30, comprising a bucket elevator 32 integral with its supporting structure 31 is mounted on skid 50 at the other end of skid 50 from where bottom conveyor 501 discharges its load. Material delivered to the site for storage by a truck is dispersed into a drive-over conveyor system 61 of an overall loading system 60. The outline of such a truck is shown in FIG. 3 and designated at 221. Drive-over conveyor system 61 is at ground level, allowing truck 221 to belly-dump its load into the drive-over conveyor system. Loading system 60 further includes a conveyor 62 that conveys the material from drive-over conveyor system 61 into elevator 32, which lifts the material to a level above the top of the bins 20.

When the material reaches the top of elevator 32, it is transferred to a covered top conveyor system 40 mounted atop the bins. Top conveyor system 40 illustratively includes two conveyors 41 and 42 which carry the material along the top of the assembled bins, as well as rail supports 44. As described in further detail in connection with FIG. 9, top conveyor system 40 is operable to direct the material into the various bins 20 through filling inlets 207 disposed within the top end wall of the various bins. Also in the top end wall of each bin is an inspection hatch 208. Top conveyor system 40 is a covered structure, the covering being provided to protect the conveyed material from rain or other contamination as it moves along conveyors 41 and 42.

Also installed on the top of bins 20 is a safety railing 49.

Figure 5:
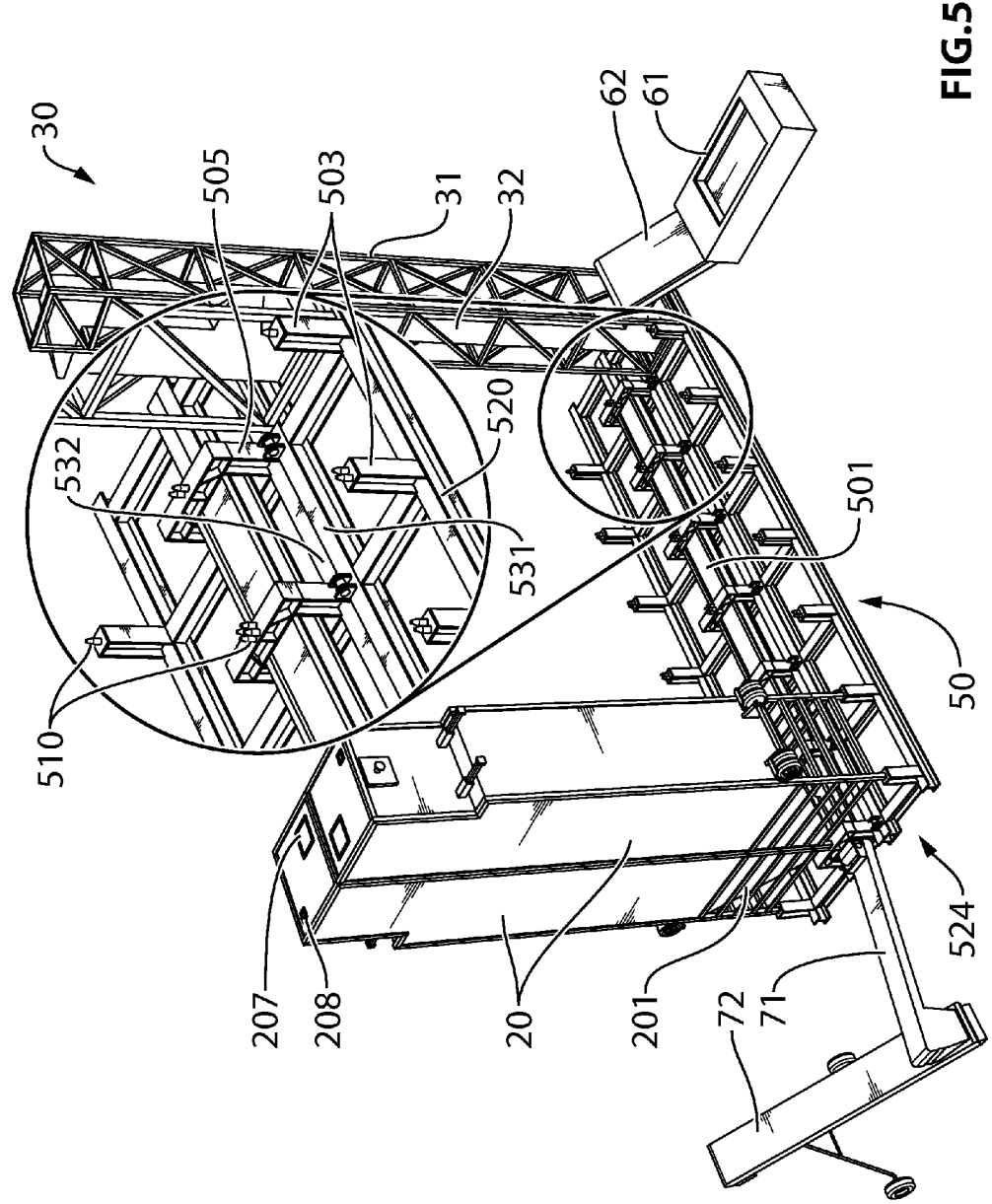
FIG. 5 is a perspective view of the system in the process of being assembled or disassembled and shows details of the skid onto which the bins and elevator are mounted.
Figure 6:
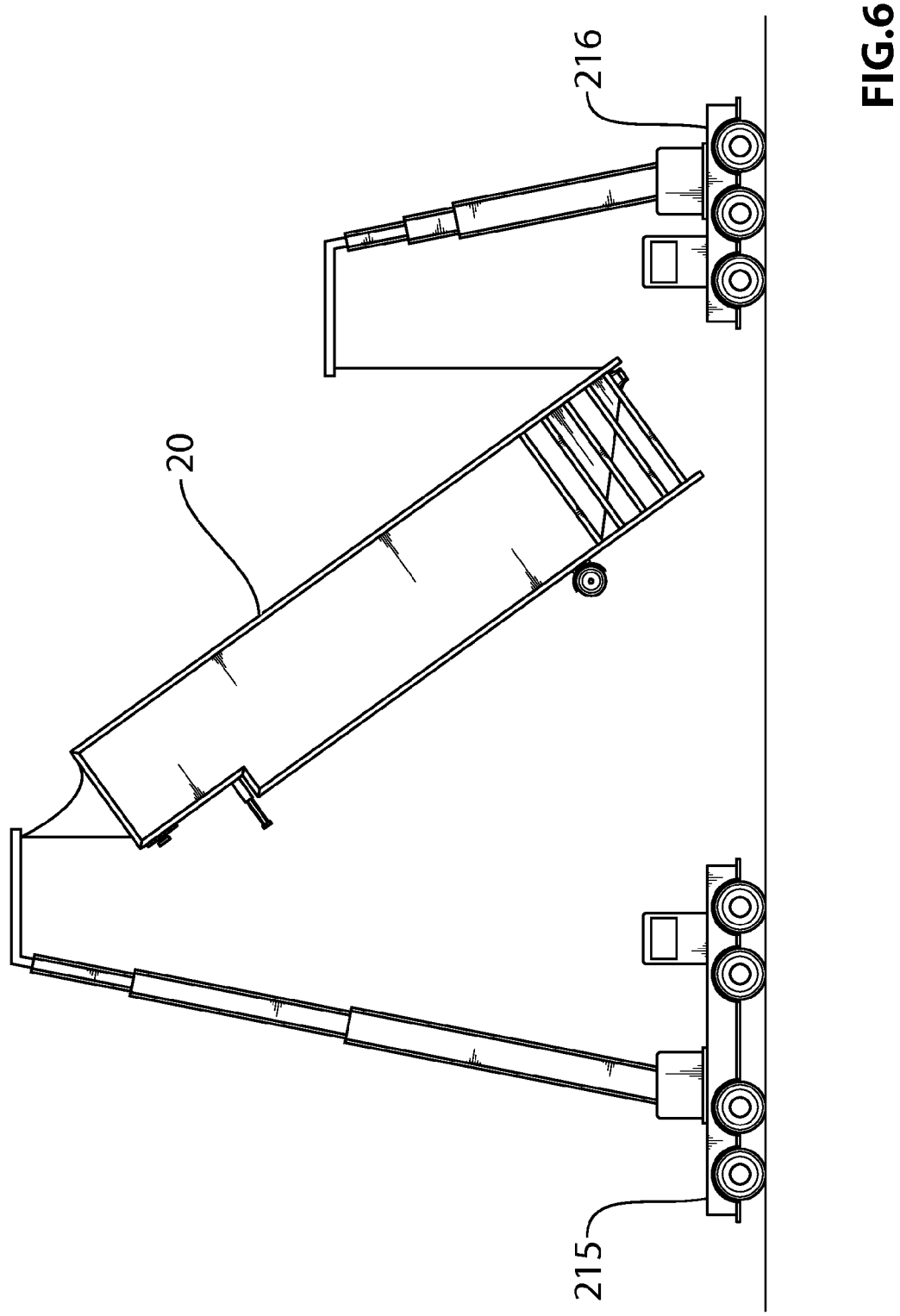
FIG. 6 depicts the process of one of the bins being lifted (or lowered) by a pair of cranes as part of the process of assembling (or disassembling) the system.
Figure 7:
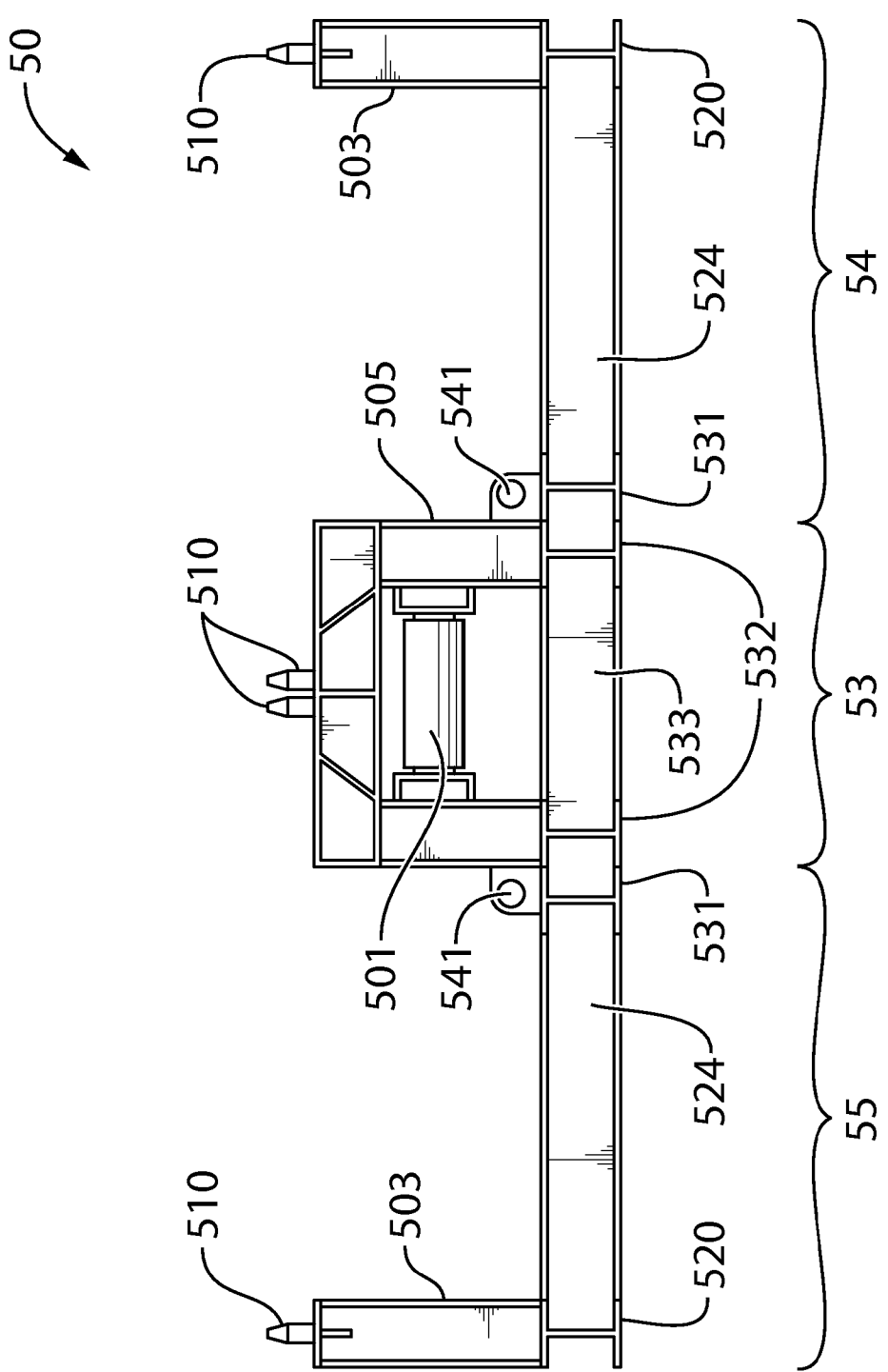
FIG. 7 is an end view of an illustrative implementation of the skid in its installed configuration.

Details of an illustrative embodiment of skid 50 can be seen in FIGS. 5-7. In order to best illustrate the various features of skid 50, FIG. 5 only shows two of the bins 20, and the ones that it shows are those installed at the opposite end of the skid from the elevator. As noted below, when the system is assembled, it is envisioned that the two bins shown would actually be the last two bins mounted onto the skid.

Skid 50 has a horizontal base that includes pair of outer beams 520 and two pairs of inner beams 531 and 532, respectively. Each outer beam 520 is connected to a respective one of beams 531 via cross-members indicated generally at 524. Each one of beams 531 is connected to a respective one of beams 532 via a set of hinges 541. Beams 532 are connected to each other via cross-members 533. It is thus seen that the base comprises a central elongate frame 53 comprising beams 532 and 533 and two elongate outer frames 54 and 55 each comprising one of beams 520, one of beams 531 and their respective cross-members 524. Bottom conveyor 501 extends along the length of skid 50 within the footprint of the central frame 53.

Standing on each of beams 520 is a row of seven upwards extending generally linear outer stanchions 503 aligned with corresponding stanchions 503 on the other one of beams 520. Aligned with each aligned pair of outer stanchions is a respective one of seven upwards extending U-shaped inner stanchions 505, each comprising a pair of legs and a cross-member. Stanchions 503 and 505 extend upward by, illustratively, 3 feet from the beams on which they stand.

Tapered leg positioners 510 mounted atop stanchions 503 and 505 are sized and positioned to receive legs 251 of bins 20, legs 251 being hollow at least at their free ends (i.e. the ends on which they stand) and having a generally square cross-section. When legs 251 are in place, each leg stands on one of stanchions 503 and 505, with a corresponding one of leg positioners 510 extending up into that leg. Holes (not shown) in each leg align with holes (not shown) in the corresponding leg positioner and a pin can be inserted through the aligned holes to secure the legs in place.

Each of the four outermost stanchions 503—i.e. the stanchions 503 at the extreme ends of each of the two rows thereof—supports a single one of legs 251 and thus has only a single one of leg positioners 510. Each of the ten inner stanchions 503 (5 in each row of same) supports two legs 251 and thus has two leg positioners 510. Each of the two outermost U-shaped stanchions 505 supports two of the legs 251 and thus has two leg positioners 510. Each of the five inner ones of U-shaped stanchions 505 supports four legs 251 and thus has four leg positioners 510.

Figure 8:
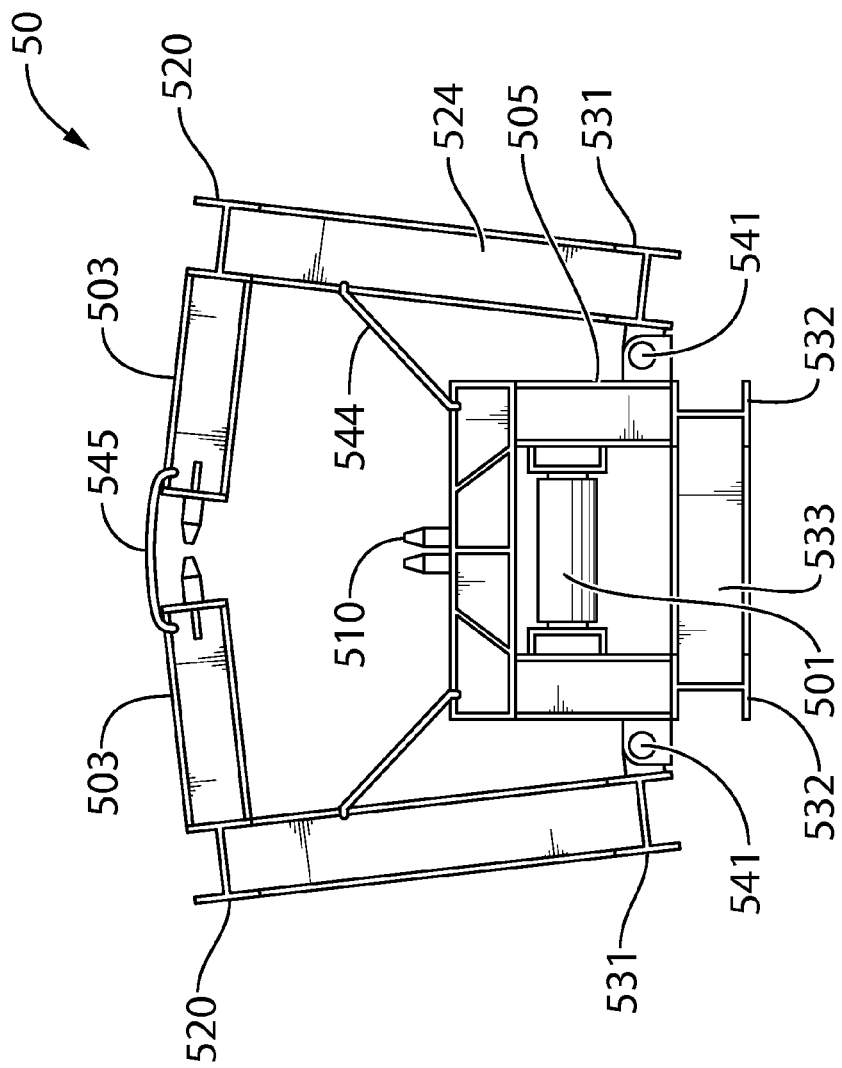
FIG. 8 is an end view of the skid showing how it can be configured to fold up for transport.

Advantageously, skid 50 is foldable to facilitate its being trucked to the site. To this end, the connection of each of beams 531 to the corresponding beam 532 is by way of hinges 541, allowing skid 50 to be folded up as seen in FIG. 8, with the two outer frames being rotated into a generally perpendicular orientation relative to the central frame. Eyebolts or the like (not shown)—bolted or otherwise affixed at strategic locations on skid 50—are provided as anchor points for load binders 544 that are used during transit to hold skid 50 in the folded position as shown in FIG. 8. Also during transit, load binders or other similar means 545 are connected between anchor points (not shown) on corresponding pairs of stanchions 503. Bottom conveyor 501 can be permanently installed within skid 50, or could be a separate element that is installed within skid 50 at the assembly site.

FIG. 9 shows top conveyor system 40 without its protective cover. System 40 includes a framework 47, conveyors 41 and 42, and chutes 46. Each of chutes 46 has a filling inlet that sits underneath tracks 43 on which conveyor 42 travels, and each of chutes 46 has a flanged discharge outlet that fits into a respective one of, bin filling inlets 207. As indicated by the designation "sand path," material lifted by elevator 32 gets discharged onto the leftmost end of upper conveyor 41, from which it travels from left to right to a discharge end of conveyor 41 and drops onto conveyor 42. The conveying belt of conveyor 42 is controllable to convey the material thereon either left-to-right or right-to-left. Moreover, the entirety of conveyor 42 is controllable to move along tracks 43 either left-to-right or right-to-left.

These capabilities of conveyor 42 allow all of the bins to be filled. In particular with the belt of conveyor 42 traveling left-to-right, as is depicted by the sand path shown, the right-hand end of conveyor 42—one of two discharge ends—is positioned at one of a number of positions along tracks 43 so as to be successively positioned over the six right-most ones of chutes, allowing the conveyed material to drop into each of those six chutes and thus into the six right-most bins. When the belt of conveyor 42 is caused to travel right-to-left, the sand or other material is conveyed along conveyor 42 underneath conveyor 41. The left-hand end of conveyor 42—its other discharge end—is moved to various positions along tracks 43 so as to be successively positioned over the six left-most ones of chutes, allowing the conveyed material to drop into each of those six chutes and thus into the six left-most bins. In the embodiment shown, it will be desirable to turn off the conveyor belts when conveyor 42 is being moved to its various positions so that none of the conveyed material will drop into the open spaces between the chutes.

As an alternative, the filling inlets of the chutes can be widened so as to touch each other and/or all the open space below conveyor 42 can be closed up, so that none of the conveyed material can drop anywhere other than into one of the chutes. Such a configuration would allow conveyor 42 to be moved from one of its positions to the next without having to stop the conveyor belts between repositionings of conveyor 42.

Advantageously, a 12-bin system such as that just shown and described can be assembled in about 6-8 hours and disassembly requires approximately that same amount of time.

An illustrative order of system assembly process is as follows:

a) Skid 50 is brought onto the site in its folded configuration (FIG. 8) on truck bed and a crane places it on a concrete pad, rig mats or other support at ground level. Each storage bin—configured as trailer—is hauled onto the site via a tractor 210 and disengaged therefrom. The other elements of the system are also brought to the site, these including the bucket elevator system 30, the top conveyor system 40, the safety railings 49, a control station (not shown) for operating the various moving elements, as well as other components (generator, cables, etc.) that will be apparent to those skilled in the art.

b) The skid is opened from its folded configuration into its installed configuration (FIG. 7) and bottom conveyor 501 is then installed in its proper place within the skid if conveyor 501 arrived on site as a separate unit.

c) Lifting equipment, such as one or more cranes, are used to position the bucket elevator on the skid.

d) The lifting equipment, such as the pair of cranes 215 and 216 as shown in FIG. 6, elevate the bins and the bin legs are positioned on their respective leg positioners 510 and secured with pins inserted through holes in the legs and the positioners. One of the two bins nearest the elevator is the first to be put in place. Then the other bin nearest the elevator is put in place. The remaining bins are similarly put in place next to those already installed. As each bin is put in place, an associated section of the safety railing 49 is also installed.

e) The crane(s) lift the top conveyor system 40 onto the top of the structure thus assembled with the discharge outlets of the chutes 46 fitting into the bin inlets 207.

f) Various other components, such as the control station, an electrical generator and its cables and so forth are installed at appropriate/convenient places and points of time during the assembly process. The loading and unloading systems 60 and 70 are also brought to the site and put in position to make the system ready for operation. The control station is advantageously installed in a location that provides an operator with a good view of the discharge stinger 70.

Disassembly may be conducted in essentially the reverse order. A different order of assembly and/or disassembly may be used, as may be found desirable.

Some illustrative physical dimensions, capacities and parameters are as follows:
a) Bin dimensions: 50' (length)×8.5' (width)×10.5' (height)
b) Skid dimensions (system footprint) 22'×58'
c) System height: 65'
d) Storage capacity: ~1,956 tons (1,774 metric tonnes) @100 pounds per cubic foot density
e) Fill rate: 200 tons/hour
f) Fill time: 10 hours of actual filling
g) Fill time: 13 hours start to finish
g) Blender feed rate: 0-20 tons/minute.

The foregoing presents a particular embodiment of a system embodying the principles of the invention. Those skilled in the art will be able to devise alternatives and variations which, even if not explicitly disclosed herein, embody those principles and are thus within the invention's spirit and scope.

The invention claimed is:

1. A system for storing bulk material, the system comprising
a skid,
a bottom conveyor,
a plurality of elongate storage bins to store the bulk material, each of the bins having at least one discharge outlet at an end thereof,
wherein the skid, the bottom conveyor and the bins are configured in such a way that each of the bins can be removeably stood on the skid in a upright position with the bins' respective discharge outlets facing downward directly over the bottom conveyor, so that when material in a bin is allowed to flow downward from the bin through its discharge outlet, the material falls onto the bottom conveyor, and
a top conveyor system including a first conveyor configured to receive material transferred to the top conveyor system and a second conveyor disposed at a level below the first conveyor and moveable to various locations at each of which at least a portion of the second conveyor is underneath the first conveyor so that material dropped off of the first conveyor transfers to the second conveyor.

2. The system of claim 1 wherein each of the bins is configured as a trailer haulable by a tractor in a tractor-trailer configuration.

3. The system of claim 1 wherein each of the bins has a respective filling inlet at an end opposite that of the bin's discharge outlet that faces upward when the bin is standing in an upright position, and wherein the system further comprises
an elevator, and
wherein the elevator is configured to lift material to be stored in the bins to a height greater than the height of the filling inlets when the bins are standing on the skid, and
the elevator and top conveyor system are configured in such a way that material lifted by the elevator transfers to the top conveyor system, and
the top conveyor system is further configured in such a way that the material conveyed thereon can be directed to the filling inlets of the bins.

4. The system of claim 3 wherein the skid and the elevator are further configured in such a way that the elevator can be mounted on the skid.

5. The system of claim 3 wherein the top conveyor system further includes
a framework,
a plurality of chutes each having a filling inlet and a discharge outlet, the chutes being attached to the framework in such a way that each of the chute discharge outlets can be aligned with a respective one of the bin filling inlets,
wherein the first conveyor attached to the framework and configured to receive the material transferred to the top conveyor system from the elevator and further configured to convey that material in a direction away from the elevator to a discharge end of the first conveyor at which the material drops off of the first conveyor,
wherein the second conveyor is configured to convey material thereon in a first direction to a first discharge end of the second conveyor at which the material drops off of the second conveyor and to convey material thereon in a second direction to a second discharge end of the second conveyor at which the material drops off of the second conveyor,
the chutes and the second conveyor being further configured in such a way that a) material dropping off the first discharge end of the second conveyor transfers to the filling inlets of ones of the chutes when the second conveyor is at certain ones of its locations, and b) material dropping off the second discharge end of the second conveyor transfers to the filling inlets of the other ones of the chutes when the second conveyor is at certain other ones of its locations.

6. The system of claim 1 wherein the bins are substantially rectangular in cross-section over at least a majority of corresponding lengths of said bins, and wherein the skid is configured in such a way that two or more of the bins can be positioned side-by-side in at least a first line of bins.

7. The system of claim 6 wherein the skid and the elevator are further configured in such a way that the elevator can be mounted onto the skid adjacent to a bin that is at an end of the first line of bins.

8. The system of claim 7 wherein the bottom conveyor is further configured to convey the material that falls on it in a direction away from the elevator and substantially parallel to the first line of bins.

9. The system of claim 6 wherein the skid is further configured in such a way that two or more others of the bins can be positioned side-by-side in a second line parallel to the first line.

10. The system of claim 1 wherein each bin includes a plurality of legs each having a hollow end, and wherein the skid further includes a plurality of positioners each affixed to, and extending upwards from the skid and configured to receive the hollow end of a respective one of the legs.

11. The system of claim 10 wherein the bins and the skid are configured in such a way that each of the bin legs stands on at least one of the stanchions when the bins are standing on the skid; and wherein each of the positioners is affixed to a particular one of the stanchions.

12. A system for storing bulk material, the system comprising
a skid having a plurality of beams and a plurality of stanchions connected to respective beams and extending upward therefrom,
a bottom conveyor, and
a plurality of elongate storage bins to store the bulk material, each of the bins having at least one discharge outlet at an end thereof, wherein the skid, the bottom conveyor and the bins are configured in such a way that each of the bins can be removeably stood on the skid in a upright position with the bins' respective discharge outlets facing downward directly over the bottom conveyor, so that when material in a bin is allowed to flow downward from the bin through its discharge outlet, the material falls onto the bottom conveyor;

wherein each of the bins has a respective filling inlet at an end opposite that of the bin's discharge outlet that faces upward when the bin is standing in an upright position an elevator, a top conveyor system a first conveyor attached to framework of the top conveyor system, and a second conveyor disposed at a level below the first conveyor, wherein the second conveyor is moveable to various locations so that material dropped off of the first conveyor transfers to the second conveyor.

\* \* \* \* \*